United States Patent
Kaiho et al.

(10) Patent No.: US 11,307,717 B2
(45) Date of Patent: Apr. 19, 2022

(54) INFORMATION PROCESSING APPARATUS AND INFORMATION PROCESSING SYSTEM

(71) Applicant: SONY CORPORATION, Tokyo (JP)

(72) Inventors: Daisuke Kaiho, Chiba (JP); Aki Nakano, Chiba (JP); Hiroshi Bando, Tokyo (JP); Junichi Morimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 231 days.

(21) Appl. No.: 16/489,195

(22) PCT Filed: Feb. 7, 2018

(86) PCT No.: PCT/JP2018/004145
§ 371 (c)(1),
(2) Date: Aug. 27, 2019

(87) PCT Pub. No.: WO2018/179872
PCT Pub. Date: Oct. 4, 2018

(65) Prior Publication Data
US 2020/0009454 A1    Jan. 9, 2020

(30) Foreign Application Priority Data

Mar. 28, 2017  (JP) ................. 2017-063181

(51) Int. Cl.
*G06F 3/044*     (2006.01)
*A63F 13/23*     (2014.01)
(Continued)

(52) U.S. Cl.
CPC .............. *G06F 3/044* (2013.01); *A63F 13/23* (2014.09); *A63F 13/80* (2014.09);
(Continued)

(58) Field of Classification Search
CPC .......... A63F 13/23; A63F 13/80; A63F 13/65; G06K 7/10128; G06K 7/10297; G06F 3/04845; G06F 3/0488
See application file for complete search history.

(56) References Cited

U.S. PATENT DOCUMENTS

2016/0004894 A1    1/2016 Tanikawa et al.
2016/0087692 A1*   3/2016 Shimomura ............ A63F 13/31
                                                     340/10.1
(Continued)

FOREIGN PATENT DOCUMENTS

CN    105052043 A    11/2015
CN    107615234 A     1/2018
(Continued)

OTHER PUBLICATIONS

International Search Report and Written Opinion of PCT Application No. PCT/JP2018/004145, dated Mar. 27, 2018, 11 pages of ISRWO.

*Primary Examiner* — Mirza F Alam
(74) *Attorney, Agent, or Firm* — Chip Law Group

(57) ABSTRACT

More flexible contactless communication is made possible. There is provided an information processing apparatus including a detection unit that detects a position of a device to be detected relative to a detection surface, a first communication unit that performs contactless communication with the device on the basis of the position, and a second communication unit that performs predetermined communication with an information processing terminal on the basis of acquisition of identification information of the device based on the contactless communication.

15 Claims, 12 Drawing Sheets

(51) Int. Cl.
  *A63F 13/80* (2014.01)
  *G06K 7/10* (2006.01)
  *H04B 5/00* (2006.01)
  *A63F 13/98* (2014.01)
  *A63F 13/235* (2014.01)

(52) U.S. Cl.
  CPC ..... *G06K 7/10128* (2013.01); *G06K 7/10297* (2013.01); *G06K 7/10356* (2013.01); *H04B 5/0031* (2013.01); *A63F 13/235* (2014.09); *A63F 13/98* (2014.09); *A63F 2300/1025* (2013.01); *A63F 2300/80* (2013.01)

(56) References Cited

U.S. PATENT DOCUMENTS

| | | |
|---|---|---|
| 2016/0087693 A1 | 3/2016 | Shimomura et al. |
| 2016/0162036 A1* | 6/2016 | Shi ................... G06F 3/04883 345/174 |
| 2018/0140946 A1* | 5/2018 | Ueno ................ G07F 17/3211 |
| 2019/0232154 A1* | 8/2019 | Kurabayashi ........ G06F 3/041 |
| 2021/0208726 A1* | 7/2021 | Lee ..................... H04B 5/0025 |

FOREIGN PATENT DOCUMENTS

| | | |
|---|---|---|
| EP | 3001287 A1 | 3/2016 |
| EP | 3001288 A1 | 3/2016 |
| JP | 2004-054914 A | 2/2004 |
| JP | 2006-195925 A | 7/2006 |
| JP | 2016-066153 A | 4/2016 |
| JP | 2016-177814 A | 10/2016 |
| WO | 2014/136167 A1 | 9/2014 |
| WO | 2016/185768 A1 | 11/2016 |
| WO | 2017/208672 A1 | 12/2017 |

\* cited by examiner

FIG. 1
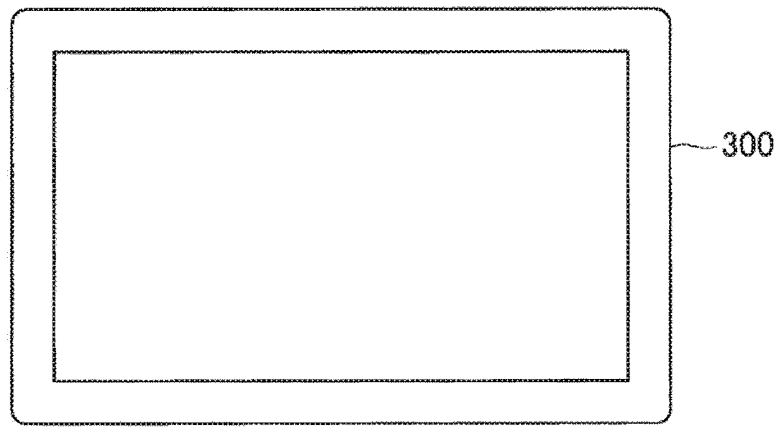
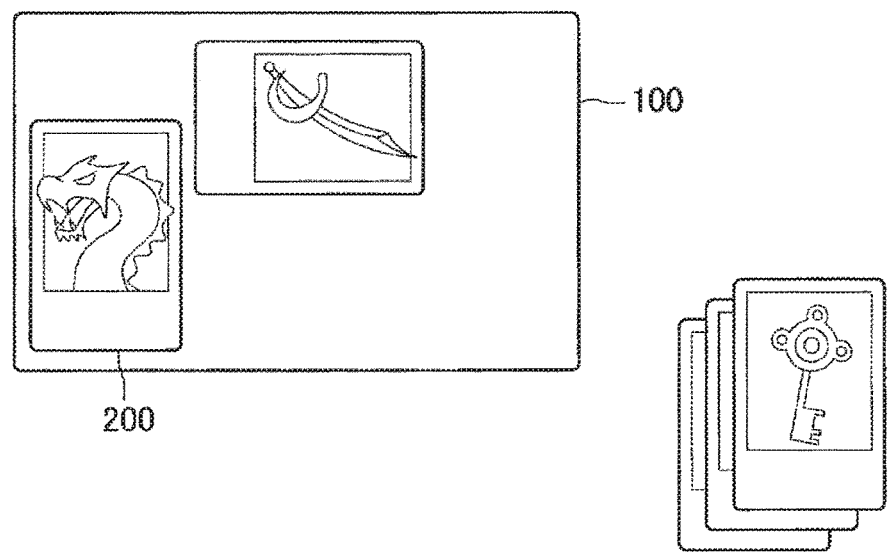
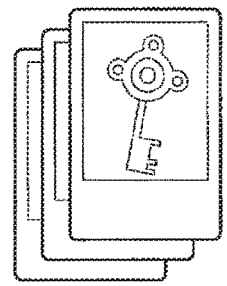
FIG. 2
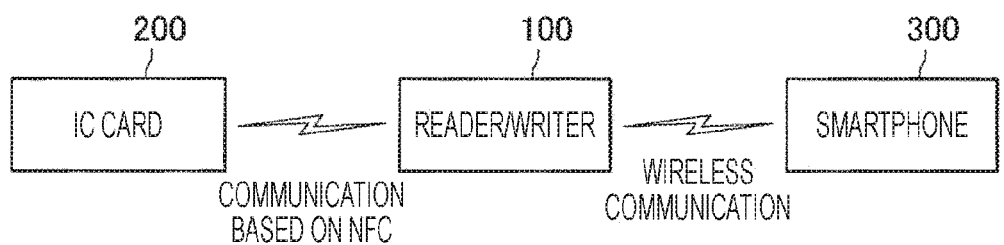

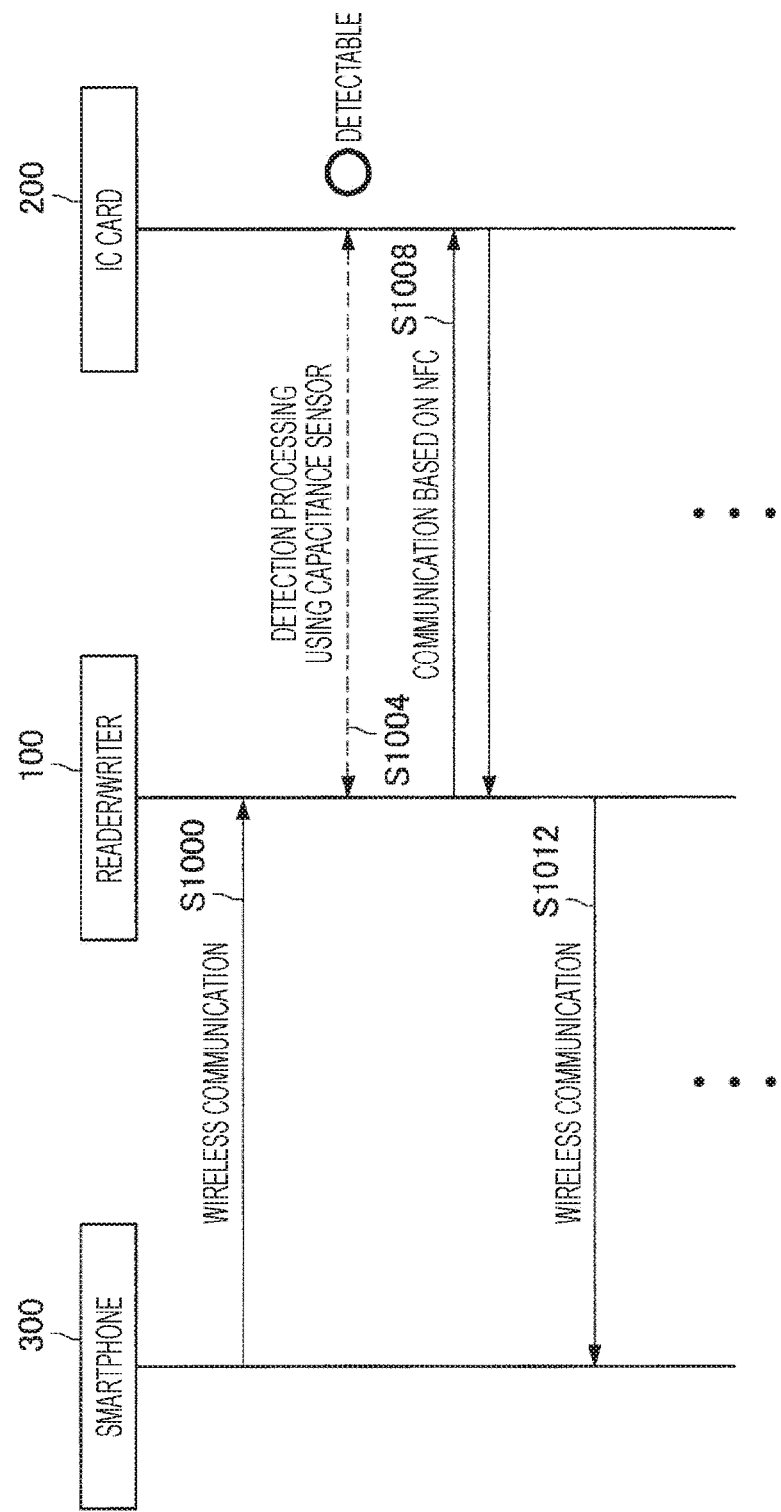

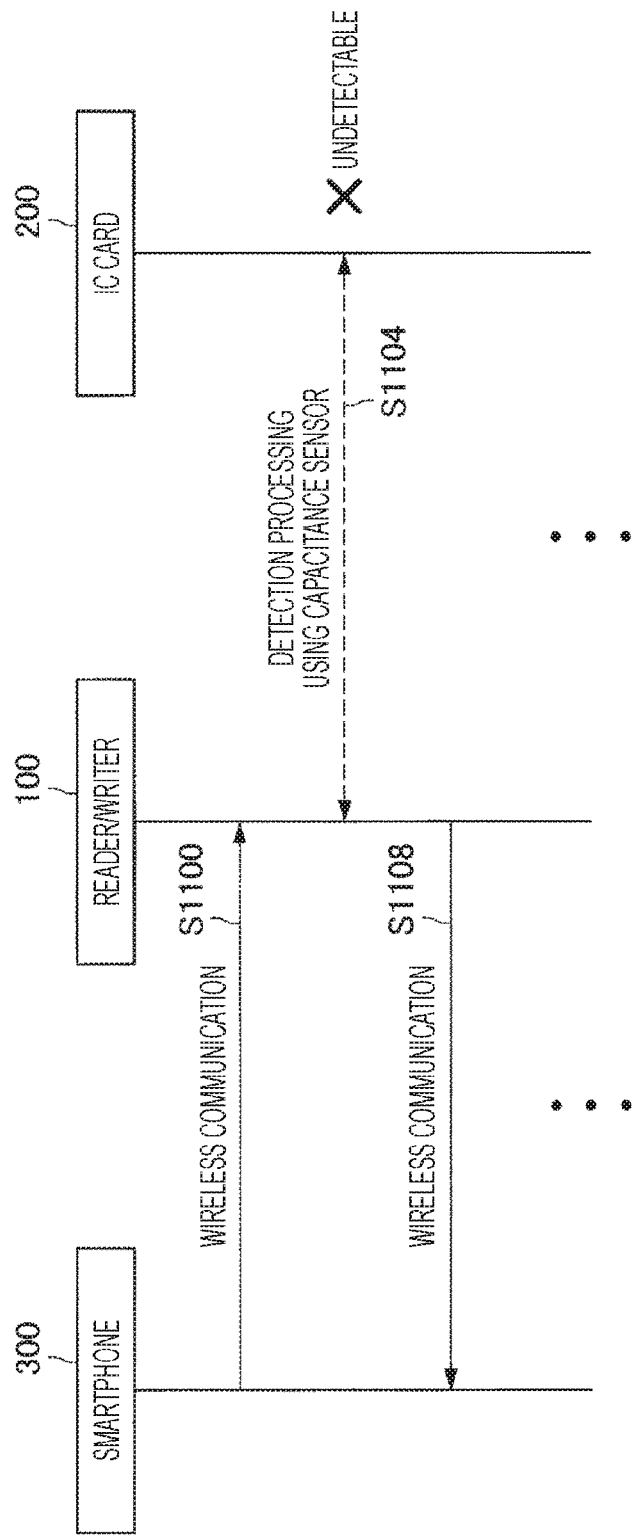

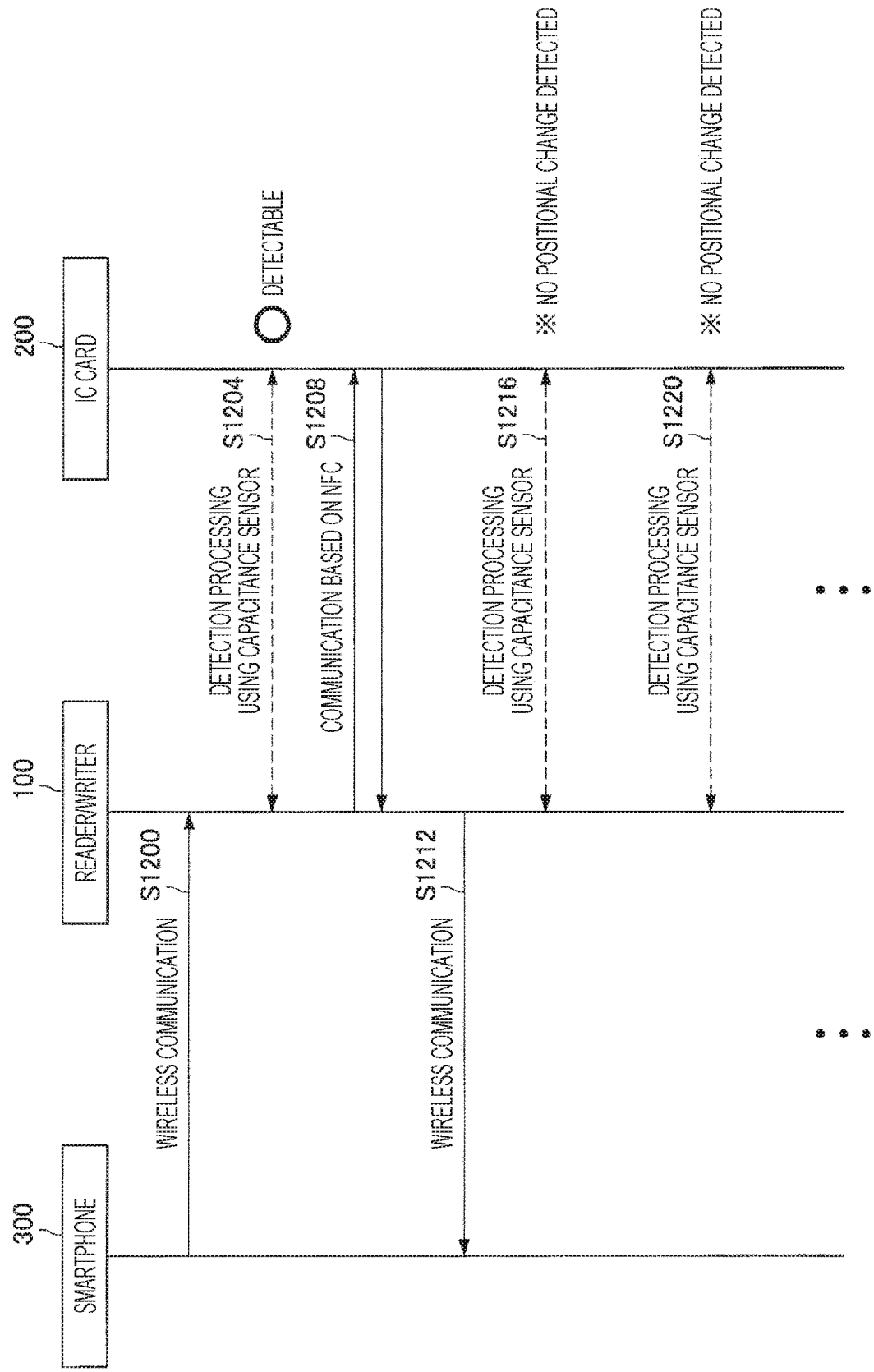

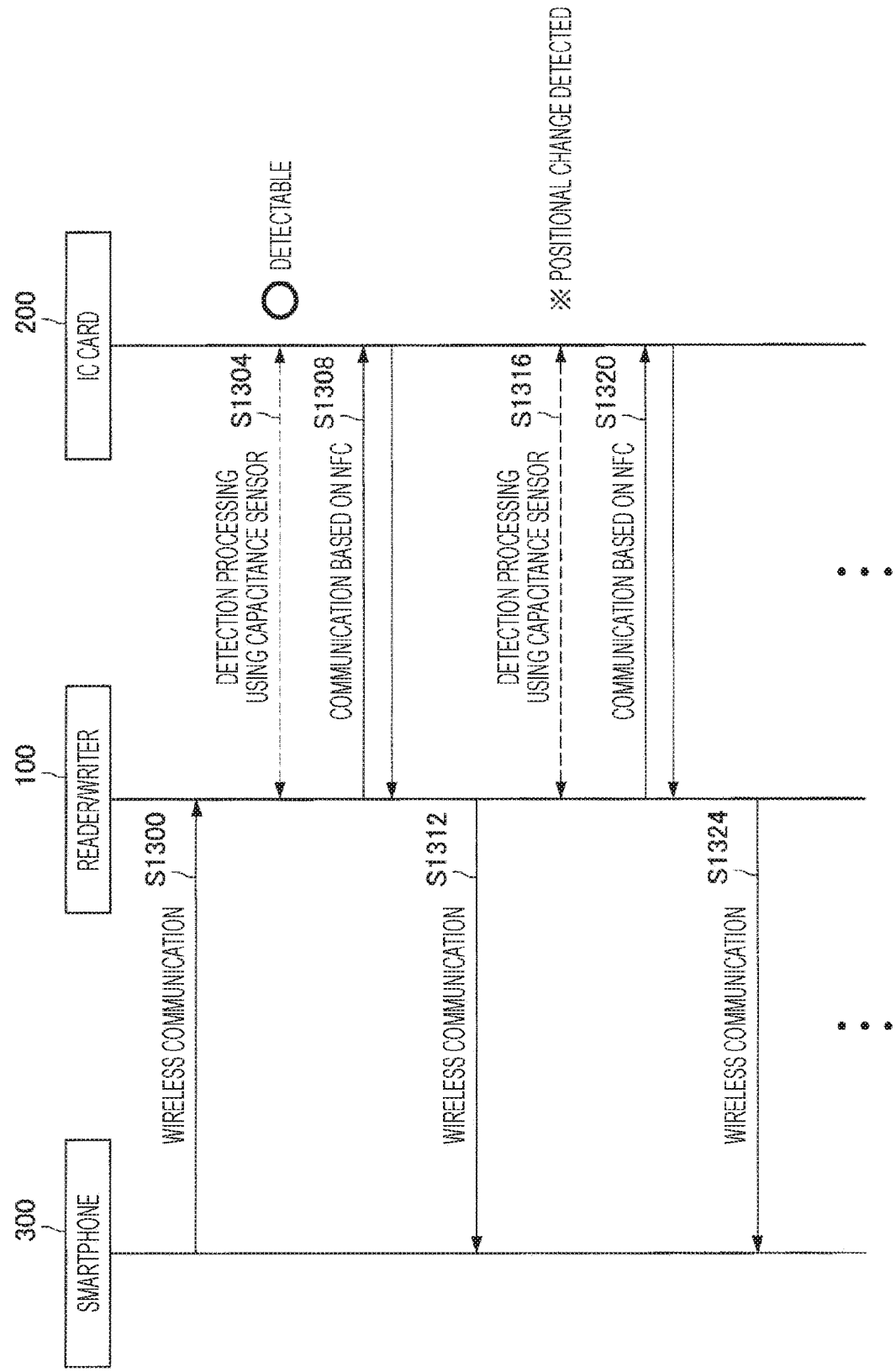

INFORMATION PROCESSING APPARATUS AND INFORMATION PROCESSING SYSTEM

CROSS REFERENCE TO RELATED APPLICATIONS

This application is a U.S. National Phase of International Patent Application No. PCT/JP2018/004145 filed on Feb. 7, 2018, which claims priority benefit of Japanese Patent Application No. JP 2017-063181 filed in the Japan Patent Office on Mar. 28, 2017. Each of the above-referenced applications is hereby incorporated herein by reference in its entirety.

TECHNICAL FIELD

The present disclosure relates to an information processing apparatus, an information processing system, and a program.

BACKGROUND ART

Along with the recent progress of information processing technology, contactless communication has been used in various systems or devices. For example, Patent Document 1 set out below discloses a technique in which contactless communication is performed with a doll having a built-in integrated circuit (IC) chip being placed on a pad having a built-in reader/writer and user authentication is performed on the basis of a user ID stored in the IC chip.

CITATION LIST

Patent Document

Patent Document 1: Japanese Patent Application Laid-Open No. 2004-54914

SUMMARY OF THE INVENTION

Problems to be Solved by the Invention

Here, depending on an existing technique, there has been a case where contactless communication is not performed in a flexible manner. For example, according to the technique of Patent Document 1, since the reader/writer cannot detect the position of a device having a built-in IC chip, in a situation where multiple reader/writers are disposed at different positions and it is unclear which one of the reader/writers is be used for contactless communication, each of the reader/writers needs to be constantly activated, which may result in occurrence of adverse effects, such as an increase in power consumption.

The present disclosure has been conceived in view of the above, and the present disclosure provides a novel and improved information processing apparatus, an information processing system, and a program capable of implementing more flexible contactless communication.

Solutions to Problems

According to the present disclosure, there is provided an information processing apparatus including a detection unit that detects a position of a device to be detected relative to a detection surface, a first communication unit that performs contactless communication with the device on the basis of the position, and a second communication unit that performs predetermined communication with an information processing terminal on the basis of acquisition of identification information of the device based on the contactless communication.

Furthermore, according to the present disclosure, there is provided an information processing system including a device to be detected and an information processing apparatus that detects the device, in which the information processing apparatus includes a detection unit that detects a position of the device relative to a detection surface, a first communication unit that performs contactless communication with the device on the basis of the position, and a second communication unit that performs predetermined communication with an information processing terminal on the basis of acquisition of identification information of the device based on the contactless communication.

Furthermore, according to the present disclosure, there is provided a program that causes a computer to detect a position of a device to be detected relative to a detection surface, to perform contactless communication with the device on the basis of the position, and to perform predetermined communication with an information processing terminal on the basis of acquisition of identification information of the device based on the contactless communication.

Effects of the Invention

As described above, according to the present disclosure, it becomes possible to implement more flexible contactless communication.

Note that the effect described above is not necessarily limited, and any of the effects described in the present specification or another effect that can be understood from the present specification may be exerted in addition to the effect described above or instead of the effect described above.

BRIEF DESCRIPTION OF DRAWINGS

FIG. 1 is a diagram illustrating a configuration of an information processing system according to the present disclosure.

FIG. 2 is another diagram illustrating the configuration of the information processing system according to the present disclosure.

FIG. 10 is a sequence diagram illustrating first operation.

FIG. 11 is a sequence diagram illustrating second operation.

FIG. 12 is a sequence diagram illustrating third operation.

FIG. 13 is a sequence diagram illustrating fourth operation.

MODE FOR CARRYING OUT THE INVENTION

Figure 3A:
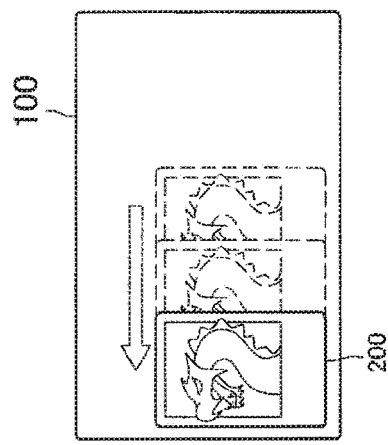
FIGS. 3A, 3B, 3C, 3D, and 3E are diagrams illustrating an example of how to use an IC card according to the present disclosure.
Figure 3B:
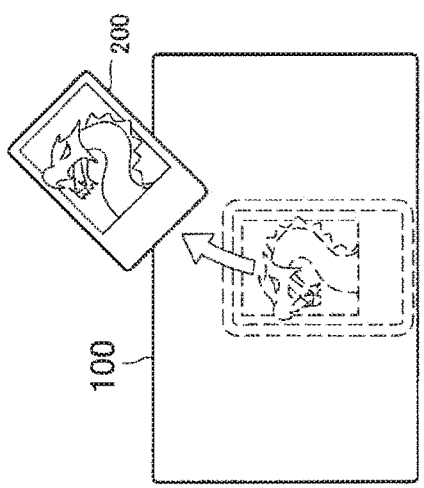
Figure 3C:
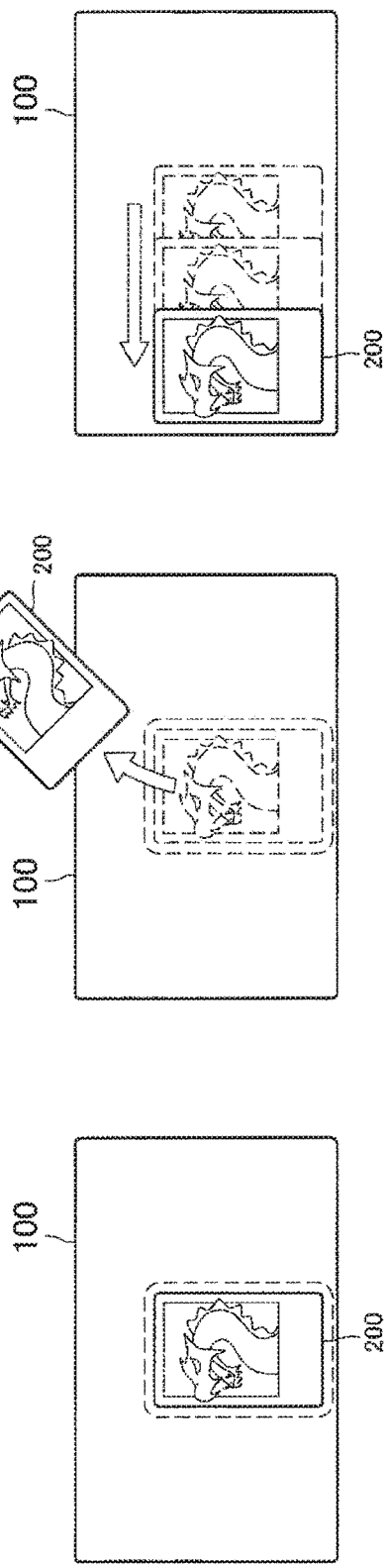
Figure 3D:
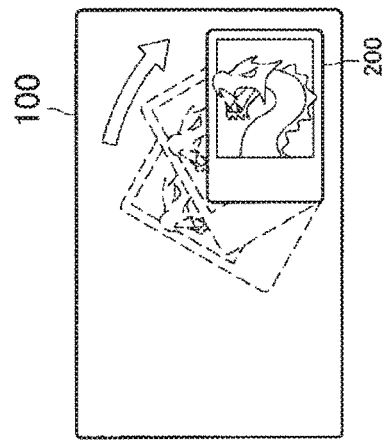

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Note that descriptions will be given in the following order.
1. Background
2. Overview of Information Processing System according to the Present Disclosure
3. Functional Configuration of Each Device
4. Operation of Each Device
5. Use of Detection Result other than Metal Portion of IC Card
6. Hardware Configuration of Reader/Writer
7. Conclusion 1. Background First, the background of the present disclosure will be described.

As described above, while contactless communication has been widely used in various systems or devices along with the recent progress of information processing technology, there has been a case where the contactless communication is not performed in a flexible manner depending on an existing technique. For example, according to the technique of Patent Document 1, since the reader/writer cannot detect the position of a device having a built-in IC chip, in a situation where multiple reader/writers are disposed at different positions and it is unclear which one of the reader/writers is be used for contactless communication, each of the reader/writers needs to be constantly activated, which may result in occurrence of adverse effects, such as an increase in power consumption.

The present disclosing party has come to create the present disclosure in light of the circumstances described above. A reader/writer according to the present disclosure is capable of detecting a position of an IC card, and performs contactless communication on the basis of a detected position. Accordingly, more flexible contactless communication can be implemented. Hereinafter, an embodiment of the present disclosure will be described in detail.

2. Overview of Information Processing System According to the Present Disclosure The foregoing has described the background of the present disclosure. Next, an overview of an information processing system according to the present disclosure will be described.

Note that, while various communication schemes can be adopted as the contactless communication in the present disclosure, an exemplary case where near field communication (NFC) is adopted as the contactless communication will be described in the present specification.

The present disclosure can be applied to various devices or systems. In the present specification, an exemplary case where the present disclosure is applied to a card game will be described.

2-1. Configuration of Information Processing System According to the Present Disclosure, Etc.

Here, a configuration of the information processing system according to the present disclosure will be described with reference to FIGS. 1 and 2. FIGS. 1 and 2 are diagrams illustrating the configuration of the information processing system according to the present disclosure. As illustrated in FIG. 1, the information processing system according to the present disclosure includes a reader/writer 100, an IC card 200, and a smartphone 300. Further, as illustrated in FIG. 2, the reader/writer 100 and the IC card 200 communicate with each other using NFC, and the reader/writer 100 and the smartphone 300 also communicate with each other wirelessly.

Further, a user of the present information processing system can play a card game by, for example, placing or moving the IC card 200 on the reader/writer 100 to cause each device to operate in cooperation with each other.

Figure 3E:
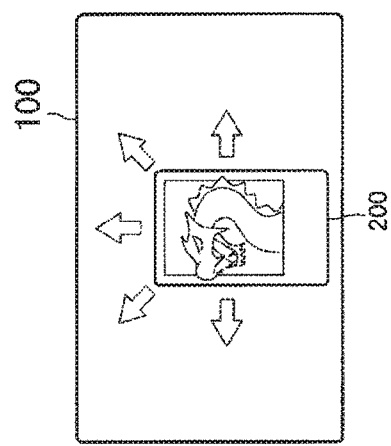

Here, an example of how to use the IC card 200 will be described with reference to FIGS. 3A, 3B, 3C, 3D, and 3E. FIGS. 3A, 3B, 3C, 3D, and 3E are diagrams illustrating an example of how to use the IC card 200 according to the present disclosure. As illustrated in FIGS. 3A, 3B, 3C, 3D, and 3E, the user places the IC card 200 on the reader/writer 100 (FIG. 3A), removes the placed IC card 200 from the reader/writer 100 (FIG. 3B), changes the position of the IC card 200 (FIG. 3C), continuously moves the IC card 200 in the top-down and right-left directions (FIG. 3D), or changes the orientation of the IC card 200 (FIG. 3E). Then, the user can enjoy the card game by, for example, the smartphone 300 displaying various objects on the display or generating various sounds in conjunction with those operations.

The reader/writer 100 according to the present disclosure is an information processing apparatus that performs various kinds of processing by the IC card 200 being placed on a detection surface of its own device. In particular, the reader/writer 100 according to the present disclosure detects the position, direction, or the like of the IC card 200 placed on the detection surface, and cooperates with the IC card 200 or the smartphone 300 on the basis of a result of the detection, thereby implementing various functions. Details will be described later. Note that, although the detection surface is assumed and described to be a flat surface on which the IC card 200 is placed in the present specification, it is not limited thereto, and the detection surface may be in any shape. For example, the detection surface may be a spherical surface.

The IC card 200 according to the present disclosure is a card used for a game, which is also a device to be detected by the reader/writer 100. For example, illustrations of characters, items, actions, or the like are drawn on each of a plurality of IC cards 200, and the user places or moves each of the IC cards 200 on the detection surface of the reader/writer 100 in accordance with the rules of the game. Note that, although a case where the plurality of IC cards 200 is used is assumed and described in the present specification, the type of the IC card 200 may be one type. Furthermore, although an exemplary case where the IC card 200 is used is described in the present specification, it is not limited thereto. For example, a figure or the like on which an IC chip is mounted may be used instead of the IC card 200.

The smartphone 300 according to the present disclosure is an information processing terminal that performs various kinds of processing by wirelessly communicating with the reader/writer 100. For example, in a case where the IC card 200 is placed on the detection surface of the reader/writer 100, the smartphone 300 receives information and the like of the IC card 200 from the reader/writer 100 to display various objects on the display of its own device or generate various sounds on the basis of the information. Furthermore, the smartphone 300 may control operation of the reader/writer 100 or the IC card 200 by transmitting various signals to the reader/writer 100. For example, the smartphone 300 may instruct the reader/writer 100 to start the game, or may instruct rewriting of data in the IC card 200 by transmitting various control signals.

Note that, although descriptions are made on the assumption that the reader/writer 100 and the smartphone 300 wirelessly communicate with each other in the present specification, it is not limited thereto. For example, the reader/writer 100 and the smartphone 300 may perform wired communication. Furthermore, the wireless communication performed by the reader/writer 100 and the smartphone 300 may be any type. For example, the reader/writer 100 and the smartphone 300 may perform communication using Bluetooth (registered trademark), infrared communication, sound wave communication, or the like.

Furthermore, although an exemplary case where the smartphone 300 is used is described in the present specification, it is not limited thereto. For example, instead of the smartphone 300, various information processing terminals may be used, such as a personal computer (PC), a tablet PC, a television, a digital camera, a digital video camera, a portable game machine, a portable audio player, a home appliance, a robot, and an in-car device (car navigation system, etc.).

2-2. Functional Overview of Information Processing System According to the Present Disclosure The foregoing has described the configuration and the like of the information processing system according to the present disclosure. Next, a functional overview of the information processing system according to the present disclosure will be described.

The reader/writer 100 according to the present disclosure detects the position of the IC card 200 placed on the detection surface of its own device, and performs communication based on NFC on the basis of a result of the detection. More specifically, a plurality of capacitance sensors is disposed on the detection surface of the reader/writer 100 on which the IC card 200 is to be placed, whereby the position of the IC card 200 can be detected on the basis of a change in capacitance detected by the capacitance sensors with the IC card 200 being placed (or approaching).

Figure 4:
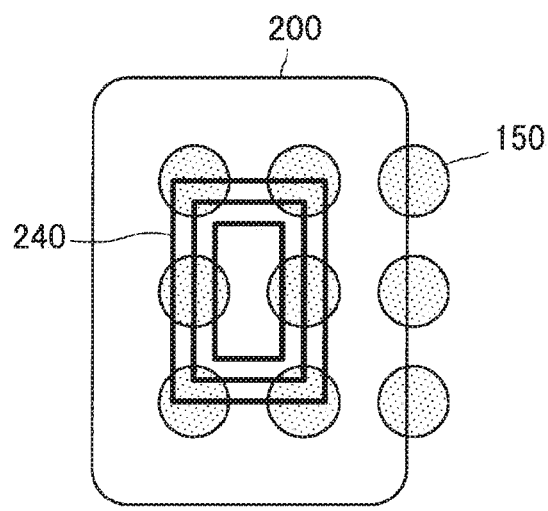
FIG. 4 is a diagram illustrating an exemplary capacitance sensor included in a reader/writer.

Here, an example of the capacitance sensor included in the reader/writer 100 will be described with reference to FIG. 4. FIG. 4 is a diagram illustrating an example of the capacitance sensor included in the reader/writer 100. As illustrated in FIG. 4, a plurality of capacitance sensors 150 is disposed on the detection surface of the reader/writer 100. Further, by the IC card 200 being placed on (or brought close to) the detection surface, the capacitance sensors 150 disposed in the vicinity of the position at which a metal portion 240 (an antenna is assumed, but not limited thereto) included in the IC card 200 is placed detect a change in capacitance. The reader/writer 100 recognizes at which position on the detection surface the IC card 200 is placed on the basis of the change in capacitance.

Figure 5:
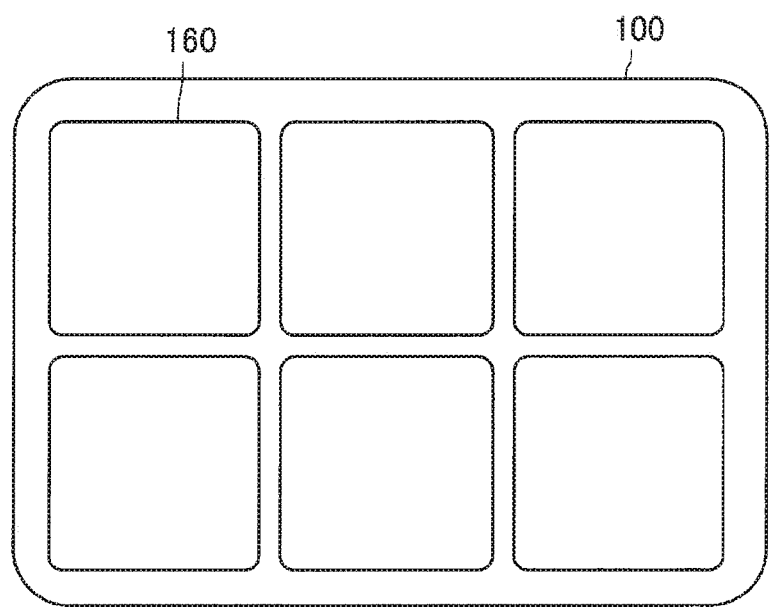
FIG. 5 is a diagram illustrating an exemplary antenna included in the reader/writer.

Further, the reader/writer 100 includes a plurality of antennas used for communication based on NFC, and communicates, using NFC, with the IC card 200 using the antenna near the position of the IC card 200. Here, an example of the antenna included in the reader/writer 100 will be described with reference to FIG. 5. FIG. 5 is a diagram illustrating an exemplary antenna included in the reader/writer 100.

As illustrated in FIG. 5, the reader/writer 100 includes antennas 160 disposed in each area obtained by the detection surface being divided in a grid and at the lower stage of the capacitance sensor 150. Note that, it is not limited thereto, and the arrangement aspect of the antennas 160 may be changed as appropriate. Further, in a case where the position of the IC card 200 is detected, the reader/writer 100 performs communication based on NFC using, among the plurality of antennas 160, an antenna 160 that is most likely to succeed in performing communication based on NFC. For example, the reader/writer 100 stops each of the antennas 160 until the position of the IC card 200 is detected, and in a case where the position of the IC card 200 is detected, it activates the antenna 160 closest to the position to perform communication based on NFC. Accordingly, the reader/writer 100 can succeed in performing communication based on NFC regardless of the position on the detection surface at which the IC card 200 is placed by the user, and not all of the antennas 160 are constantly activated, whereby power consumption can be further reduced.

Furthermore, the reader/writer 100 performs control in such a manner that the time when the detection processing of the IC card 200 is performed by the capacitance sensor 150 does not overlap the time when the communication based on NFC between the reader/writer 100 and the IC card 200 is performed. More specifically, there may be a case where, at the time when the communication based on NFC is performed, a magnetic field generated by the reader/writer 100 affects the detection of a change in capacitance performed by the capacitance sensor 150, whereby the reader/writer 100 may erroneously detect the IC card 200. Therefore, by the time when the detection processing of the IC card 200 is performed by the capacitance sensor 150 not overlapping the time when the communication based on NFC with the IC card 200 is performed, the reader/writer 100 can detect the IC card 200 properly.

Furthermore, in a case where the position of the IC card 200 (or the IC card 200 itself) is not detected, the reader/writer 100 does not perform communication based on NFC. Since the communication based on NFC requires power more than that required for, for example, processing of the capacitance sensor 150, the reader/writer 100 can reduce the power required for the communication based on NFC. Furthermore, after detecting the position of the IC card 200, the reader/writer 100 can perform various kinds of control on the basis of a change in the position of the IC card 200. For example, in a case where a change in the position of the IC card 200 is detected, the reader/writer 100 may perform the communication based on NFC and various kinds of processing, and in a case where a change in the position of the IC card 200 is not detected, the reader/writer 100 may not perform the communication based on NFC again. The wireless communication between the reader/writer 100 and the smartphone 300 is similar to that described above.

Furthermore, the reader/writer 100 controls the wireless communication with the smartphone 300 on the basis of whether or not identification information of the IC card 200 has been successfully obtained by the communication based on NFC with the IC card 200. More specifically, while the reader/writer 100 wirelessly communicates with the smartphone 300 in a case where the identification information of the IC card 200 has been obtained through the communication based on NFC with the IC card 200, it does not wirelessly communicate with the smartphone 300 in a case where the identification information of the IC card 200 has not been obtained. Note that this operation is an example, and may be changed as appropriate. For example, the reader/writer 100 may not wirelessly communicate with the smartphone 300 even in a case where the identification information of the IC card 200 has been obtained, and may wirelessly communicate with the smartphone 300 even in a case where the identification information of the IC card 200 has not been obtained. Furthermore, the identification information is any information that can identify the IC card 200, and may be, for example, "IDm".

The reader/writer 100 can determine, on the basis of the identification information, whether or not the object placed on the detection surface is the IC card 200 according to the present disclosure. Therefore, in a case where an IC card other than the IC card 200, or other objects are placed on the detection surface, the reader/writer 100 does not wirelessly communicate with the smartphone 300, whereby the power required for the wireless communication can be reduced.

Furthermore, the reader/writer 100 according to the present disclosure is also capable of detecting the orientation of the IC card 200 placed on the detection surface. More specifically, the metal portion 240 included in the IC card 200 has different lengths in the longitudinal direction and in the lateral direction. For example, as illustrated in FIG. 4, the longitudinal length of the metal portion 240 may be about three times as long as the capacitance sensor 150, and the lateral length may be about twice as long as the capacitance sensor 150. In this manner, since the metal portion 240 has different lengths in the longitudinal direction and in the lateral direction, a result of the detection performed by the capacitance sensor 150 differs depending on the direction in which the IC card 200 is placed, whereby the reader/writer 100 can detect the orientation of the IC card 200. The reader/writer 100 detects the orientation of the IC card 200, and interlocks the orientation with the card game, whereby fun of the card game can be enhanced. Note that, FIG. 4 is an example, and the lengths of the metal portion 240 in the longitudinal direction and in the lateral direction may be changed as appropriate. Furthermore, the shape of the metal portion 240 is not limited to a substantially rectangular shape, and may be any shape.

Furthermore, the reader/writer 100 is also capable of detecting a change in capacitance due to a portion other than the metal portion 240 in the IC card 200 to use a result of the detection for processing. Details will be described in "5. Use of Detection Result other than Metal Portion of IC Card".

3. Functional Configuration of Each Device

The foregoing has described the functional overview of the information processing system according to the present disclosure. Next, a functional configuration of each device according to the present disclosure will be described with reference to FIGS. 6 to 9.

3-1. Functional Configuration of Reader/Writer 100

Figure 6:
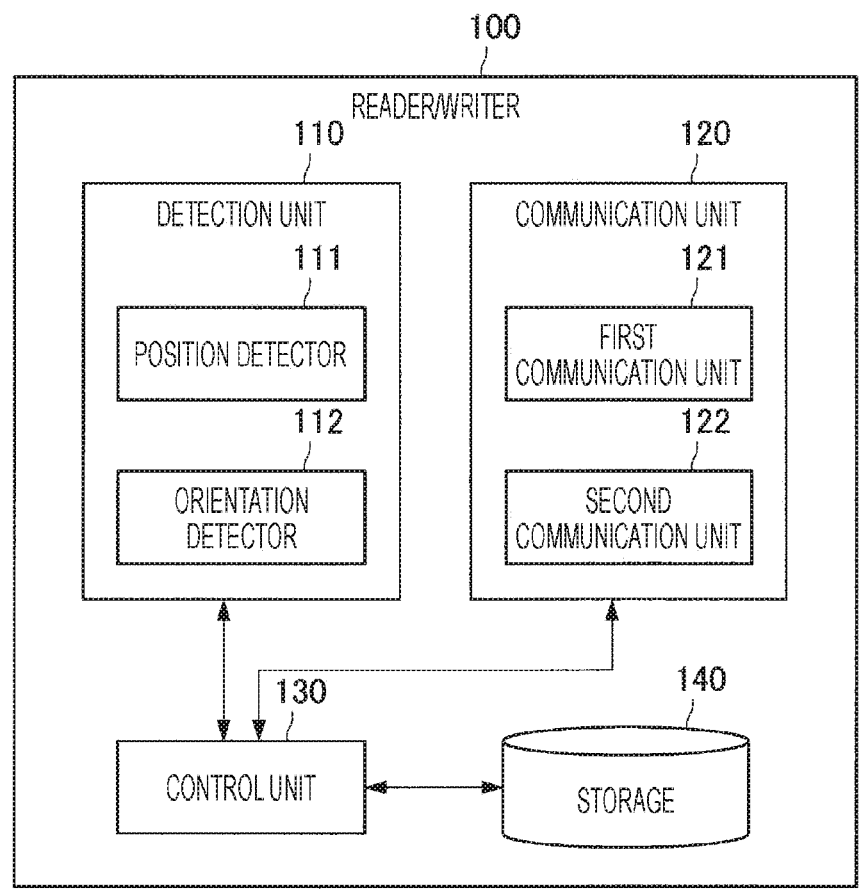
FIG. 6 is a block diagram illustrating a functional configuration of the reader/writer according to the present disclosure.

First, a functional configuration of the reader/writer 100 according to the present disclosure will be described with reference to FIG. 6. FIG. 6 is a block diagram illustrating the functional configuration of the reader/writer 100 according to the present disclosure. As illustrated in FIG. 6, the reader/writer 100 according to the present disclosure includes a detection unit 110, a communication unit 120, a control unit 130, and a storage 140. Furthermore, the detection unit 110 includes a position detector 111 and an orientation detector 112, and the communication unit 120 includes a first communication unit 121 and a second communication unit 122.

Detection Unit 110

The detection unit 110 includes the capacitance sensor 150, and detects the IC card 200 placed on (or brought close to) the detection surface using the capacitance sensor 150. More specifically, the detection unit 110 detects the presence/absence, the number, the position, the orientation, and the like of the IC card 200 on the basis of the change in capacitance detected by the plurality of capacitance sensors 150.

Note that the above is merely an example, and the detection unit 110 may perform the detection processing using other than the capacitance sensor 150. For example, the detection unit 110 may detect the position of the IC card 200 placed on the detection surface on the basis of a captured image obtained by the IC card 200 placed on the reader/writer 100 being captured. Furthermore, the detection unit 110 may detect the position of the IC card 200 placed on the detection surface using an infrared sensor.

Then, the detection unit 110 provides the control unit 130 to be described later with information associated with the detection result of the IC card 200. Hereinafter, in particular, detection of the position and the orientation of the IC card 200 will be specifically described.

Position Detector 111

The position detector 111 detects the position on the detection surface at which the IC card 200 is placed. More specifically, the position detector 111 determines at which position on the reader/writer 100 the IC card 200 has been placed on the basis of the change in capacitance detected by each of the capacitance sensors 150.

For example, the position detector 111 may estimate the position of the central point of the IC card 200 on the basis of the change in capacitance detected by each of the capacitance sensors 150, and may treat the position of the central point as the position of the IC card 200. Furthermore, the position detector 111 may handle the entire area where the IC card 200 is placed as the position of the IC card 200. Furthermore, the position detector 111 may define a plurality of areas on the detection surface, and may treat the area including the position of the central point of the IC card 200 as the position of the IC card 200. Then, in a case where the position of the IC card 200 is detected, the position detector 111 generates positional information of the IC card 200, and provides the control unit 130 to be described later with the information.

Orientation Detector 112

The orientation detector 112 detects the orientation of the IC card 200 placed on the detection surface. More specifically, the orientation detector 112 determines the orientation of the IC card 200 placed on the detection surface on the basis of the change in capacitance detected by each of the capacitance sensors 150.

For example, the orientation detector 112 may detect the orientation of the IC card 200 relative to the detection surface, or may detect a relationship between the orientations of a plurality of IC cards 200 (e.g., short sides of two different IC cards 200 are placed to face each other). In a case where the orientation of the IC card 200 is detected, the orientation detector 112 generates orientation information of the IC card 200, and provides the control unit 130 to be described later with the information.

Control Unit 130

The control unit 130 centrally controls various kinds of processing performed by the reader/writer 100. For example, at the time when the IC card 200 is placed on the detection surface, the control unit 130 obtains information associated with the detection result of the IC card 200 (including the positional information or the orientation information of the IC card 200) from the detection unit 110, and controls various functional configurations on the basis of the information.

For example, the control unit 130 controls the first communication unit 121 to be described later such that the communication based on NFC is performed using the antenna 160 closest to the position at which the IC card 200 is placed on the basis of the positional information of the IC card 200. Accordingly, the control unit 130 can succeed in performing communication based on NFC regardless of the position on the detection surface at which the IC card 200 is placed by the user, and not all of the antennas 160 are constantly activated, whereby power consumption can be further reduced.

Furthermore, in a case where the communication based on NFC is performed, the control unit 130 performs control such that the time when the detection processing of the IC card 200 is performed by the detection unit 110 does not overlap the time when the communication based on NFC is performed. Accordingly, the detection unit 110 can properly detect the IC card 200 without being affected by the magnetic field generated in the case where the communication based on NFC is performed.

Furthermore, in a case where the position of the IC card 200 (or the IC card 200 itself) is not detected, the control unit 130 controls the first communication unit 121 to be described later so that the communication based on NFC is not performed. Accordingly, the control unit 130 can reduce the power required for the communication based on NFC.

Furthermore, the control unit 130 controls wireless communication with the smartphone 300 performed by the second communication unit 122 to be described later on the basis of whether or not the identification information of the IC card 200 has been obtained through the communication based on NFC. Accordingly, the control unit 130 can reduce the power required for the wireless communication by controlling the second communication unit 122 such that, in a case where an object other than the IC card 200 is placed on the detection surface, no wireless communication is performed basically with the smartphone 300. Note that, even in a case where the identification information of the IC card 200 has not been obtained through the communication based on NFC, the control unit 130 may control the second communication unit 122 such that predetermined signals (e.g., signals for making notification of an error, etc.) are transmitted to the smartphone 300.

The processing described above is merely an example, and the control unit 130 may control other processing. For example, it may perform various kinds of processing (e.g., rewriting of data in the IC card 200) on the basis of various signals from the smartphone 300. Furthermore, the control unit 130 may generate various signals for controlling the smartphone 300, and may cause the second communication unit 122 to transmit the signals.

Communication Unit 120

The communication unit 120 includes the first communication unit 121 that wirelessly communicates with the IC card 200 using NFC, and the second communication unit 122 that wirelessly communicates with the smartphone 300. Hereinafter, each functional configuration will be specifically described.

First Communication Unit 121

The first communication unit 121 communicates with the IC card 200 using NFC. More specifically, in a case where the position of the IC card 200 (or the IC card 200 itself) is detected, the first communication unit 121 performs, under control of the control unit 130, communication based on NFC with the IC card 200 using any of the plurality of antennas 160.

Here, any specific method or scheme may be used for the communication based on NFC. For example, the first communication unit 121 may transmit request signals to the IC card 200 to receive response signals including various kinds of information from the IC card 200 thereafter.

Second Communication Unit 122

The second communication unit 122 performs predetermined communication with the smartphone 300. More specifically, in a case where the identification information of the IC card 200 has been obtained, a change in the position of the IC card 200 has been detected, or the like, the second communication unit 122 is controlled by the control unit 130 to wirelessly communicate with the smartphone 300. Note that the second communication unit 122 may wirelessly communicate with the smartphone 300 in a case other than the above. Furthermore, as described above, the communication performed by the second communication unit 122 is not limited to the wireless communication, and communication based on various schemes including wired communication may be performed.

Storage 140

The storage 140 stores various kinds of information. For example, the storage 140 may store various kinds of information (identification information, presence/absence information (information regarding whether or not it is placed on the detection surface), positional information, orientation information, number information (information regarding the number of the IC cards 200 placed on the detection surface), and data information (various kinds of information included in the IC card 200) etc.) of the IC card 200 placed on (or previously placed) on the detection surface. Furthermore, the storage 140 may store programs, parameters, and the like used by each functional configuration of the reader/writer 100.

3-2. Functional Configuration of IC Card 200

Figure 7:
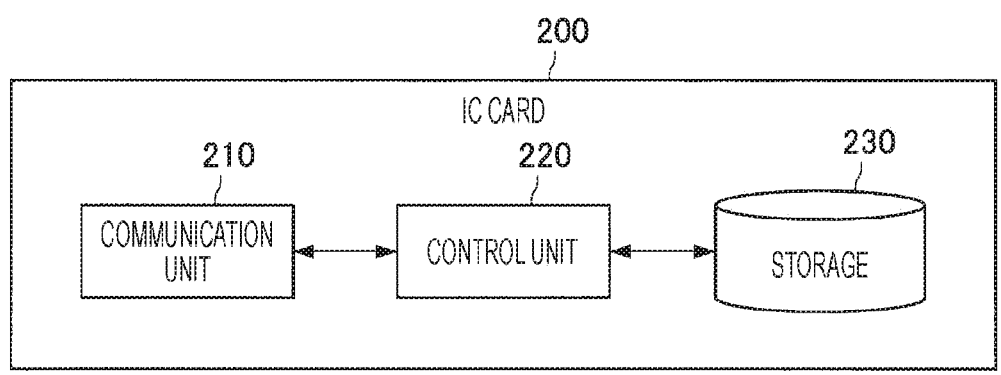
FIG. 7 is a block diagram illustrating a functional configuration of the IC card according to the present disclosure.

The foregoing has described the functional configuration of the reader/writer 100 according to the present disclosure. Next, a functional configuration of the IC card 200 according to the present disclosure will be described with reference to FIG. 7. FIG. 7 is a block diagram illustrating the functional configuration of the IC card 200 according to the present disclosure. As illustrated in FIG. 7, the IC card 200 according to the present disclosure includes a communication unit 210, a control unit 220, and a storage 230.

Communication Unit 210

The communication unit 210 performs communication based on NFC with the reader/writer 100. More specifically, in a case where the IC card 200 is placed on (or brought close to) the detection surface of the reader/writer 100, the communication unit 210 performs the communication based on NFC with the reader/writer 100. Note that, as described above, any specific method or scheme may be used for the communication based on NFC. For example, in a case where the communication unit 210 receives request signals from the reader/writer 100, it may provide the control unit 220 to be described later with content of the signals, and may transmit response signals to the reader/writer 100 after various kinds of processing is performed.

Control Unit 220

The control unit 220 centrally controls various kinds of processing of the IC card 200. For example, in a case where the communication unit 210 receives the request signals from the reader/writer 100, the control unit 220 performs various kinds of processing on the basis of the content of the request. For example, the control unit 220 updates or deletes various kinds of information stored in the storage 230 to be described later, adds new information, or the like. Accordingly, the control unit 220 can change an attribute (level, ability, etc.) of the character drawn on the IC card 200, for example, whereby the fun of the card game can be enhanced. Furthermore, in a case where various kinds of processing are performed on the basis of the request signals from the reader/writer 100 as described above, for example, the control unit 220 may generate response signals to provide the communication unit 210 with the signals, thereby implementing transmission of the response signals.

Storage 230

The storage 230 stores various kinds of information. For example, the storage 230 may store various kinds of information (attribute of the character drawn on the IC card 200, etc.) used for a card game. Furthermore, the storage 230 may store programs, parameters, and the like used by each functional configuration of the IC card 200.

Figure 8:
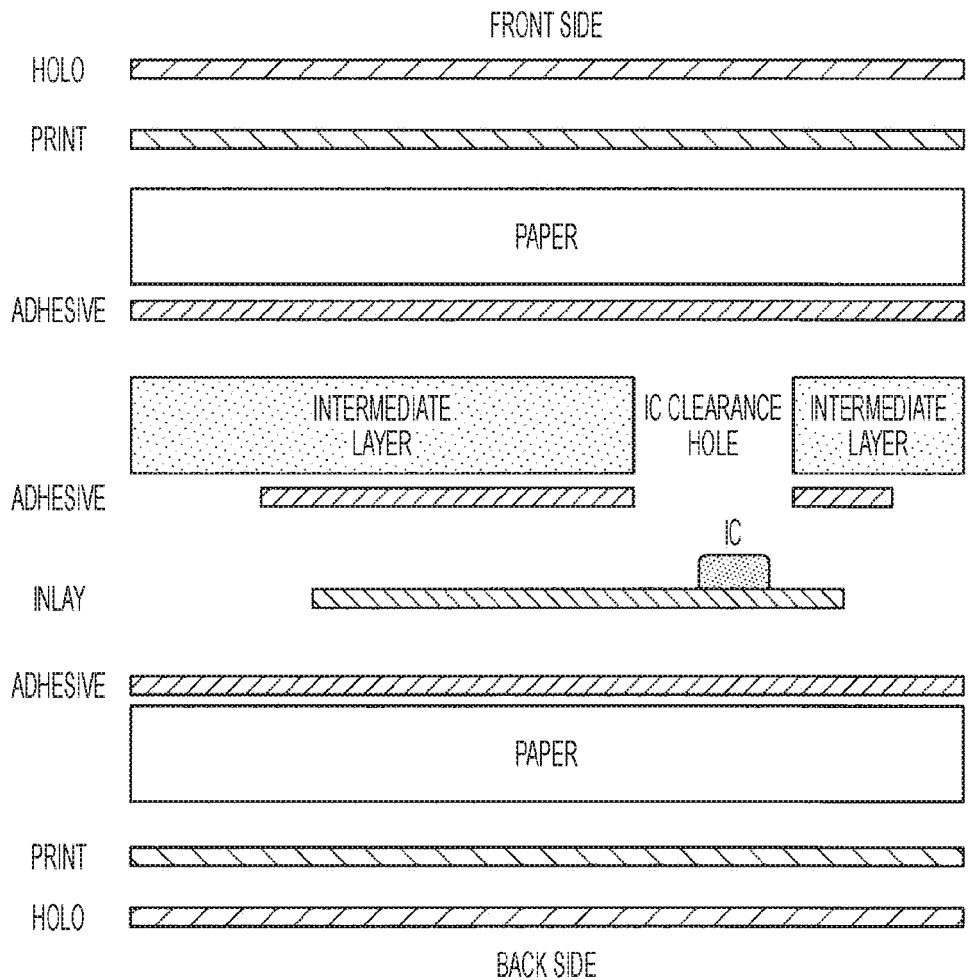
FIG. 8 is a diagram illustrating a physical configuration of the IC card according to the present disclosure.

Here, a physical configuration of the IC card 200 according to the present disclosure will be described with reference to FIG. 8. FIG. 8 is a diagram illustrating the physical configuration of the IC card according to the present disclosure. The IC card 200 according to the present disclosure is a card constituted by a plurality of layers including paper, inlay, and the like as illustrated in FIG. 8. Further, the IC card 200 according to the present disclosure includes a polyethylene terephthalate (PET) sheet in the intermediate layer.

An existing IC card not including a PET sheet is susceptible to deformation (warpage, distortion, etc.) particularly in a high-humidity environment, and thus in a case where the IC card is placed on the reader/writer, the IC card is partially separated from the capacitance sensor, whereby the capacitance is reduced and the IC card is less likely to be detected. In contrast, the IC card 200 according to the present disclosure is less likely to be deformed by the PET sheet being included, whereby the reader/writer 100 can stably detect the IC card 200. Note that FIG. 8 is an example, and the physical configuration of the IC card 200 may be changed optionally. For example, a sheet having a property similar to that of the PET sheet may be used instead of the PET sheet.

3-3. Functional Configuration of Smartphone 300

Figure 9:
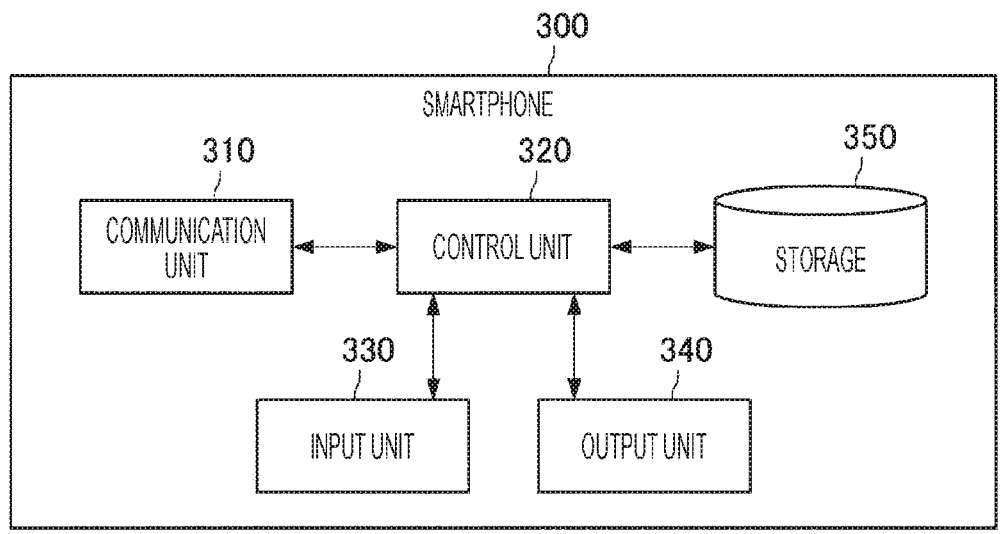
FIG. 9 is a block diagram illustrating a functional configuration of a smartphone according to the present disclosure.

The foregoing has described the functional configuration of the IC card 200 according to the present disclosure. Next, a functional configuration of the smartphone 300 according to the present disclosure will be described with reference to FIG. 9. FIG. 9 is a block diagram illustrating the functional configuration of the smartphone 300 according to the present disclosure. As illustrated in FIG. 9, the smartphone 300 according to the present disclosure includes a communication unit 310, a control unit 320, an input unit 330, an output unit 340, and a storage 350.

Communication Unit 310

The communication unit 310 wirelessly communicates with the reader/writer 100. For example, the communication unit 310 receives, from the reader/writer 100, signals including various kinds of information (identification information, presence/absence information, positional information, orientation information, number information, data information, etc.) of the IC card 200. Then, the communication unit 310 provides the control unit 320 to be described later with those pieces of received information. Furthermore, the communication unit 310 transmits, to the reader/writer 100, signals (e.g., signals for instructing a start of a game, signals for instructing rewriting of data of the IC card 200, etc.) for controlling the reader/writer 100. Note that the signals to be transmitted and received by the communication unit 310 are not limited to the above.

Control Unit 320

The control unit 320 centrally controls various kinds of processing of the smartphone 300. More specifically, the control unit 320 controls the output unit 340 to be described later on the basis of various signals received from the reader/writer 100. For example, the control unit 320 generates control signals on the basis of various kinds of information (identification information, presence/absence information, positional information, orientation information, number information, data information, etc.) of the IC card 200, and provides the output unit 340 with the signals, thereby controlling the output unit 340.

Furthermore, the control unit 320 controls various kinds of processing on the basis of input information provided from the input unit 330 to be described later. For example, in a case where input information for making notification of a start of a game is provided from the input unit 330, the control unit 320 controls various kinds of processing (e.g., generation and transmission of control signals, etc.) to control the output unit 340 and the reader/writer 100.

Input Unit 330

The input unit 330 obtains input made by the user. For example, the input unit 330 includes a button, a touch panel, or the like, and in a case where the user performs various kinds of operation on the button, the touch panel, or the like, the input unit 330 generates input information on the basis of the operation, and provides the control unit 320 with the input information. As a result, the operation made by the user is reflected in each device.

Output Unit 340

The output unit 340 controls various kinds of output. For example, the output unit 340 may include a display, a speaker, or the like, and may cause various objects to be displayed on the display or may cause various sounds to be generated by the speaker on the basis of control signals from the control unit 320. Furthermore, the output unit 340 may include a movable part, and may cause the part to move in various ways on the basis of the control signals from the control unit 320. In this manner, the output unit 340 performs various kinds of output in conjunction with the IC card 200 placed on the detection surface, whereby the fun of the game can be enhanced.

Storage 350

The storage 350 stores various kinds of information. For example, the storage 350 may store programs, parameters, and the like used by each functional configuration of the smartphone 300.

4. Operation of Each Device

The foregoing has described the functional configuration of each device according to the present disclosure. Next, operation of each device according to the present disclosure will be described.

4-1. First Operation

First, first operation will be described with reference to FIG. 10. FIG. 10 is a sequence diagram illustrating the first operation. The first operation is operation in the case where the reader/writer 100 has succeeded in obtaining the identification information of the IC card 200.

In step S1000, the smartphone 300 transmits various signals to the reader/writer 100. For example, when the user operates the smartphone 300 to start the card game, the smartphone 300 transmits signals for making notification of the start of the card game to the reader/writer 100. In step S1004, the reader/writer 100 that has received the signals starts detection processing of the IC card 200 using the capacitance sensor 150.

Then, in a case where the reader/writer 100 has succeeded in detecting the position of the IC card 200, in step S1008, the reader/writer 100 performs communication based on NFC with the IC card 200 using the antenna 160 closest to the position, thereby attempting acquisition of the identification information of the IC card 200. The reader/writer 100 that has succeeded in obtaining the identification information of the IC card 200 transmits signals including the identification information to the smartphone 300. As a result, the smartphone 300 can perform various kinds of processing corresponding to the IC card 200 placed on the reader/writer 100.

4-2. Second Operation

Next, second operation will be described with reference to FIG. 11. FIG. 11 is a sequence diagram illustrating the second operation. The second operation is operation in the case where the reader/writer 100 cannot obtain the identification information of the IC card 200.

In step S1100, the smartphone 300 transmits various signals to the reader/writer 100. In step S1104, the reader/writer 100 that has received the signals starts detection processing of the IC card 200 using the capacitance sensor 150. Then, in a case where the reader/writer 100 has failed to detect the position of the IC card 200, in step S1208, the reader/writer 100 transmits various signals (e.g., error signals, etc.) to the smartphone 300. Furthermore, as described above, in the case where the reader/writer 100 has failed to detect the position of the IC card 200, it may not be required to transmit various signals to the smartphone 300.

4-3. Third Operation

Next, third operation will be described with reference to FIG. 12. FIG. 12 is a sequence diagram illustrating the third operation. The third operation is operation in the case where, after the reader/writer 100 has succeeded in obtaining the identification information of the IC card 200, the position of the IC card 200 is not changed.

In step S1200, the smartphone 300 transmits various signals to the reader/writer 100. In step S1204, the reader/writer 100 that has received the signals starts detection processing of the IC card 200 using the capacitance sensor 150. Then, in a case where the reader/writer 100 has succeeded in detecting the position of the IC card 200, in step S1208, the reader/writer 100 performs communication based on NFC with the IC card 200 using the antenna 160 closest to the position, thereby attempting acquisition of the identification information of the IC card 200. The reader/writer 100 that has succeeded in obtaining the identification information of the IC card 200 transmits signals including the identification information to the smartphone 300.

Thereafter, the reader/writer 100 detects the position of the IC card 200 at an optional timing using the capacitance sensor 150 (steps S1216 and S1220 in the drawing). For example, the reader/writer 100 may detect the position of the IC card 200 at predetermined intervals using the capacitance sensor 150. In a case where a change of the IC card 200 is not detected, the reader/writer 100 may not perform communication based on NFC with the IC card 200 and wireless communication with the smartphone 300.

4-4. Fourth Operation

Next, fourth operation will be described with reference to FIG. 13. FIG. 13 is a sequence diagram illustrating the fourth operation. The fourth operation is operation in the case where, after the reader/writer 100 has succeeded in obtaining the identification information of the IC card 200, the position of the IC card 200 is changed.

In step S1300, the smartphone 300 transmits various signals to the reader/writer 100. In step S1304, the reader/writer 100 that has received the signals starts detection processing of the IC card 200 using the capacitance sensor 150. Then, in a case where the reader/writer 100 has succeeded in detecting the position of the IC card 200, in step S1308, the reader/writer 100 performs communication based on NFC with the IC card 200 using the antenna 160 closest to the position, thereby attempting acquisition of the identification information of the IC card 200. The reader/writer 100 that has succeeded in obtaining the identification information of the IC card 200 transmits signals including the identification information to the smartphone 300.

Thereafter, the reader/writer 100 detects the position of the IC card 200 at an optional timing using the capacitance sensor 150. Then, for example, in a case where the reader/writer 100 has succeeded in detecting the change of the IC card 200 in step S1316, in step S1320, the reader/writer 100 performs communication based on NFC with the IC card 200 using the antenna 160 closest to the changed position of the IC card 200. Any information is transmitted and received in the communication. For example, the reader/writer 100 may once again request the identification information of the IC card 200. Thereafter, in step S1324, the reader/writer 100 transmits various signals to the smartphone 300.

5. Use of Detection Result Other than Metal Portion of IC Card

The foregoing has described the operation of each device according to the present disclosure. Next, an exemplary case where a detection result of a portion other than the metal portion 240 of the IC card 200 is used for processing will be described. More specifically, as described above, while the reader/writer 100 uses the detection result of the metal portion 240, which includes the inlay, the antenna 160, and the like of the IC card 200, for processing, the detection accuracy of the position, orientation, and the like of the IC card 200 can be further improved if a detection result of a portion (e.g., paper portion, PET sheet portion, etc.) other than the metal portion 240 is used.

Here, a specific example in the case where a detection result of a portion other than the metal portion 240 of the IC card 200 is used will be described with reference to FIGS. 14A, 14B, and 14C.

Figure 14A:
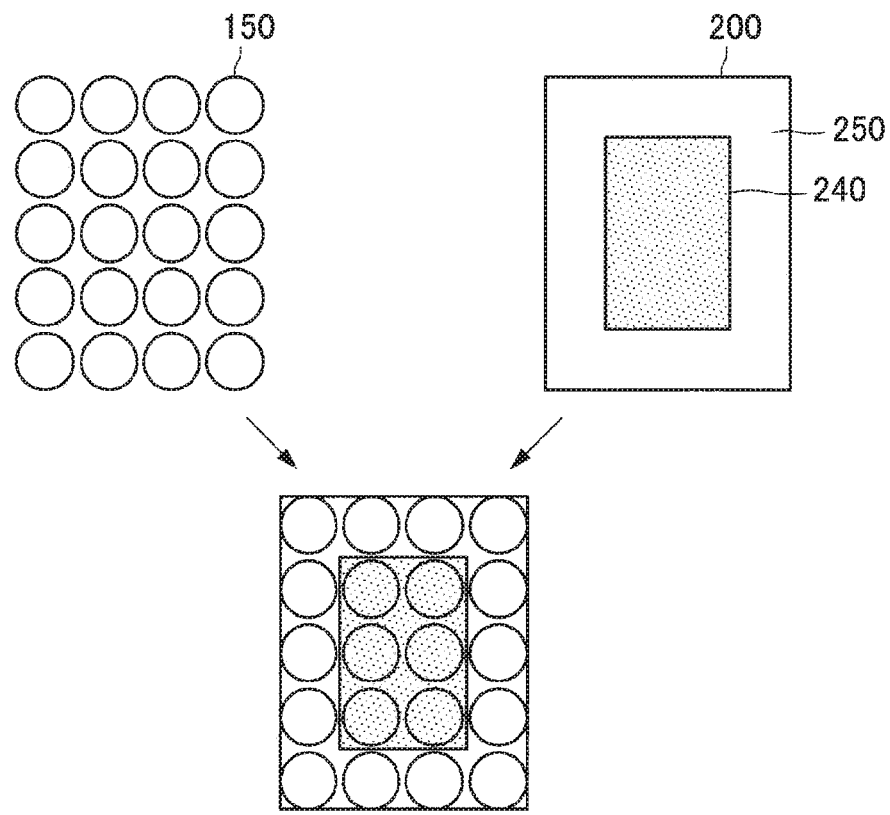
FIG. 14A is a diagram illustrating a specific exemplary case where a detection result of a portion other than a metal portion of the IC card is used for processing.

For example, as illustrated in FIG. 14A, an exemplary case where the IC card 200, which includes the metal portion 240 and the other portions (portion denoted by the reference sign "250" in the drawing), is placed on the plurality of capacitance sensors 150 included in the reader/writer 100 will be considered.

First, a case where a detection result of the portion other than the metal portion 240 of the IC card 200 is not used for processing will be described with reference to FIG. 14B. For example, as illustrated in a state 1 in FIG. 14B, it is assumed that the capacitance sensors 150 (capacitance sensors 150 denoted by "A" in the drawing) that overlap the metal portion 240 of the IC card 200 show reaction, and the reader/writer 100 detects the IC card 200 on the basis of only the reaction without using a detection result of the portion other than the metal portion 240.

Figure 14B:
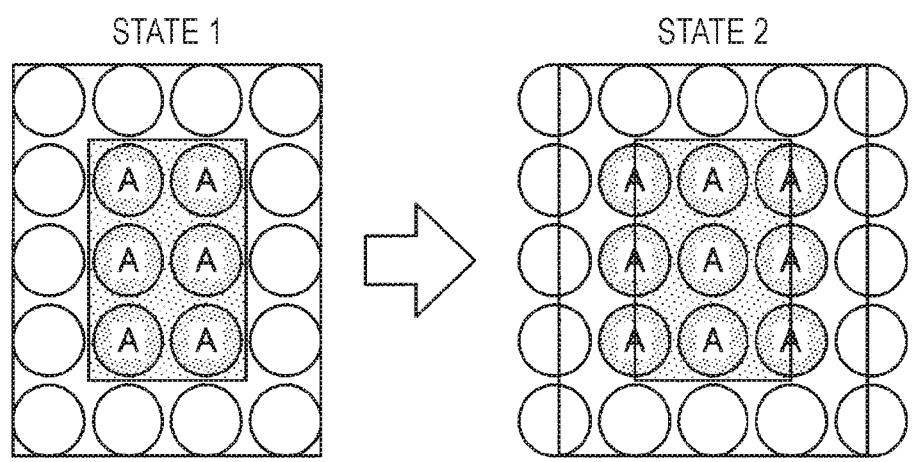
FIG. 14B is a diagram illustrating a specific exemplary case where a detection result of a portion other than the metal portion of the IC card is not used for processing.

In this case, for example, as illustrated in a state 2 in FIG. 14B, it is assumed that, due to the IC card 200 being shifted in the lateral direction, the number of the capacitance sensors 150 in the longitudinal direction and in the lateral direction, which have reacted by the IC card 200 overlapping the metal portion 240, is the same (three capacitance sensors 150 each react in the longitudinal direction and in the lateral direction in the drawing). In this case, the reader/writer 100 cannot detect the orientation of the IC card 200 depending on the number of reacted capacitance sensors 150 in the longitudinal direction and in the lateral direction.

First, a case where a detection result of the portion other than the metal portion 240 of the IC card 200 is used for processing will be described with reference to FIG. 14C. For example, as illustrated in a state 1 in FIG. 14C, the capacitance sensors 150 (capacitance sensors 150 denoted by "A" in the drawing) overlapping the metal portion 240 of the IC card 200 show relatively strong reaction, whereas the capacitance sensors 150 (capacitance sensors 150 denoted by "B" in the drawing) overlapping the portions other than the metal portion 240 of the IC card 200 show relatively low reaction. Then, it is assumed that the reader/writer 100 detects the IC card 200 on the basis of the reaction of both of them.

Figure 14C:
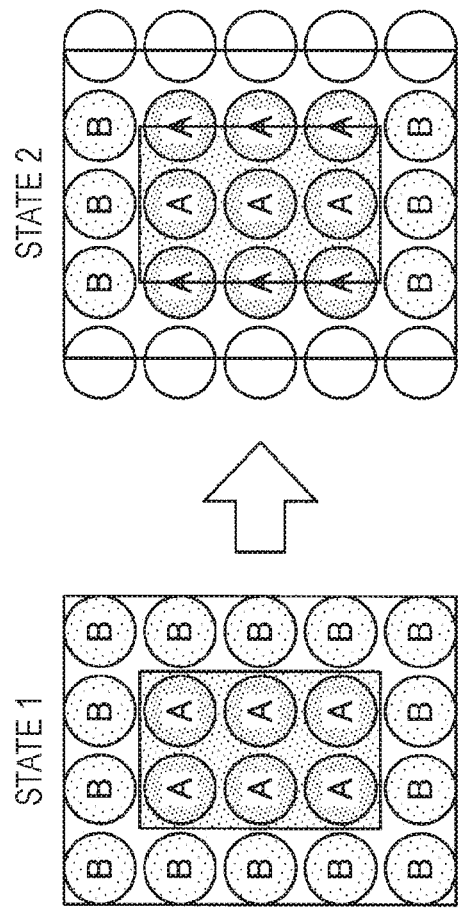
FIG. 14C is another diagram illustrating the specific exemplary case where the detection result of a portion other than the metal portion of the IC card is used for processing.

In this case, as illustrated in a state 2 in FIG. 14C, there may be a case where the orientation of the IC card 200 can be detected on the basis of the reaction of the capacitance sensors 150 overlapping the portions other than the metal portion 240 of the IC card 200 even if the number of the capacitance sensors 150 in the longitudinal direction and in the lateral direction, which have reacted by the IC card 200 overlapping the metal portion 240, is the same due to the IC card 200 being shifted in the lateral direction. For example, in the state 2 illustrated in FIG. 14C, the reader/writer 100 can detect that the IC card 200 is portrait-oriented by the capacitance sensors 150 overlapping the portions positioned upper and lower than the metal portion 240 showing reaction.

Although the case where the portions other than the metal portion 240 are used for the detection processing of the orientation of the IC card 200 has been described, it is not limited thereto. For example, portions other than the metal portion 240 may be used for detection processing of the position of the IC card 200.

Furthermore, the reader/writer 100 can improve the detection accuracy of the IC card 200 by grasping in advance information associated with the magnitude of the reaction of the capacitance sensors 150 corresponding to the metal portion 240 and the portions other than the metal portion 240, respectively, and comparing the information with actual detection results. In other words, the reader/writer 100 can further improve the detection accuracy by detecting the IC card 200 on the basis of, as well as the presence/absence of the reaction of the capacitance sensors 150, the degree of the reaction.

6. Hardware Configuration of Reader/Writer

Figure 15:
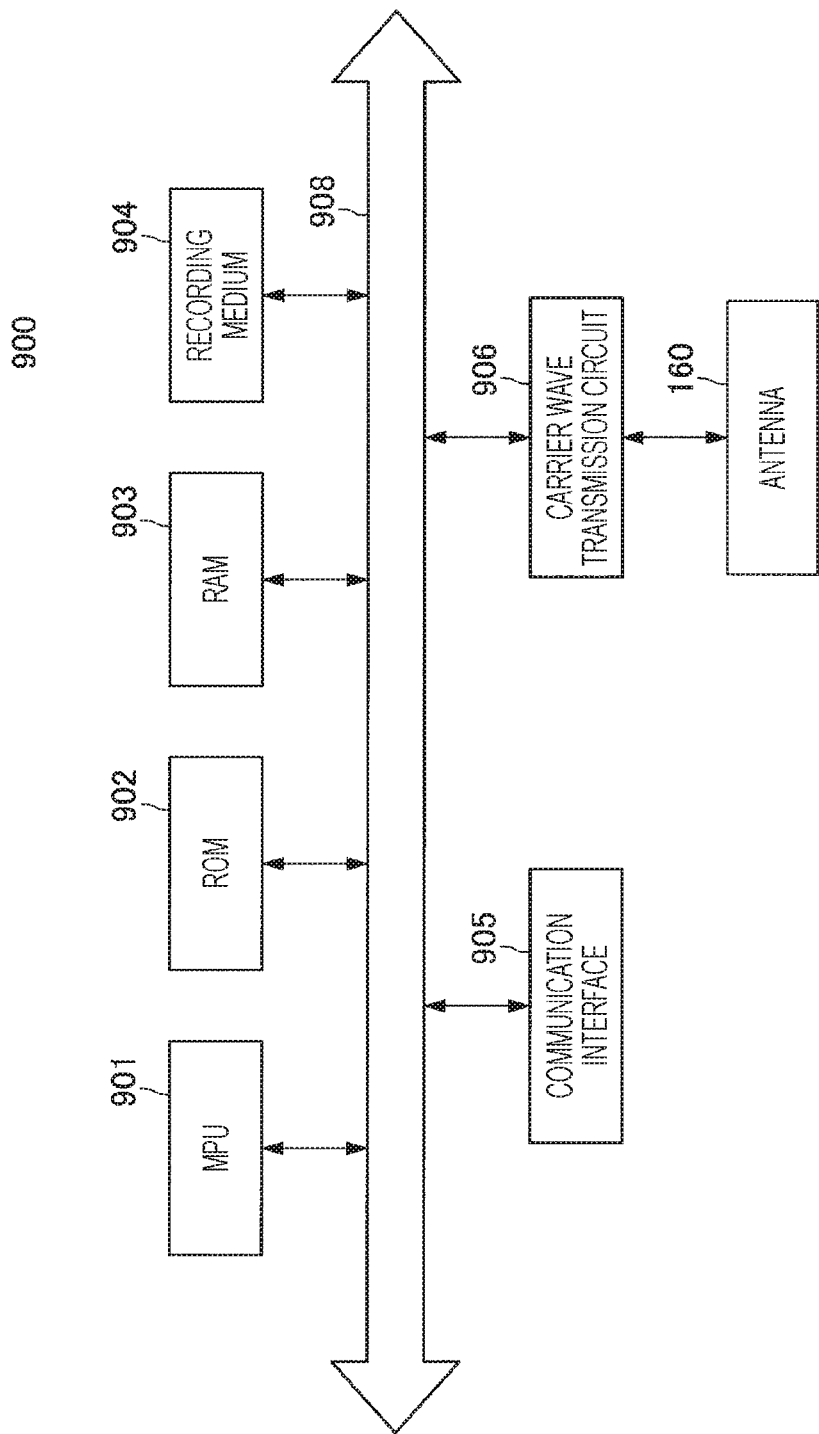
FIG. 15 is a block diagram illustrating a hardware configuration of the reader/writer according to the present disclosure.

The foregoing has described the embodiment of the present disclosure. Next, a hardware configuration of the reader/writer 100 according to the present disclosure will be described with reference to FIG. 15. FIG. 15 is a block diagram illustrating the hardware configuration of the reader/writer 100 according to the present disclosure.

The reader/writer 100 includes, for example, an MPU 901, a ROM 902, a RAM 903, a recording medium 904, a communication interface 905, a carrier wave transmission circuit 906, and the antenna 160. Furthermore, the reader/writer 100 connects the respective constituent elements by, for example, a bus 908 as a data transmission path. Furthermore, the reader/writer 100 is driven by, for example, power supplied from an internal power supply included in the reader/writer 100, such as a battery, or power supplied from a connected external power supply.

The MPU 901 includes, for example, one or more processors including an arithmetic circuit such as an MPU, various processing circuits, and the like, and functions as the control unit 130 that controls the entire reader/writer 100.

Furthermore, the MPU 901 may serve as, for example, the detection unit 110 in the reader/writer 100.

The ROM 902 stores programs to be used by the MPU 901, control data such as operation parameters, and the like. The RAM 903 temporarily stores, for example, programs to be executed by the MPU 901.

The recording medium 904 functions as the storage 140, and stores various kinds of data such as various applications and data according to the method for processing information of the present embodiment applied to the reader/writer 100, for example. Here, examples of the recording medium 904 include a magnetic recording medium such as a hard disk, and a non-volatile memory such as a flash memory. Furthermore, the recording medium 904 may be detachable from the reader/writer 100.

The communication interface 905 is a communication means that performs communication of one communication scheme included in the reader/writer 100, and functions as the second communication unit 122 for performing wireless communication (or wired communication) with the smartphone 300. Furthermore, the communication interface 905 may have any configuration that supports a network according to the present embodiment.

The carrier wave transmission circuit 906 and the antenna 160 are communication means that perform communication of another communication scheme included in the reader/writer 100, and functions as the first communication unit 121 for performing communication based on NFC with the IC card 200.

The antenna 160 includes, for example, a resonant circuit including a capacitor having predetermined capacitance and a coil having a predetermined inductance as a transmitting/receiving antenna, and a demodulation circuit. Further, the antenna 160 demodulates data or the like transmitted from the IC card 200 on the basis of load modulation or the like by, for example, receiving carrier waves of a predetermined frequency such as 13.56 [MHz]. Note that, for example, in a case where the carrier wave transmission circuit 906 includes a demodulation circuit, the antenna 160 may include a resonant circuit.

The carrier wave transmission circuit 906 includes, for example, a modulation circuit that performs modulation such as amplitude shift keying (ASK), and an amplification circuit that amplifies output of the modulation circuit, and causes the transmitting/receiving antenna of the antenna 160 to transmit carrier waves including carrier wave signals. Furthermore, the carrier wave transmission circuit 906 may include, for example, a demodulation circuit that demodulates the signals received by the antenna 160. The demodulation circuit performs, for example, envelope demodulation of a change in amplitude of the voltage between the modulation circuit (or amplification circuit) and the resonant circuit of the antenna 160, and binarize the resultant signals, thereby demodulating the signals received by the antenna 160. Note that the demodulation circuit can also demodulate the signals received by the antenna 160 using, for example, a phase change of the voltage between the modulation circuit (or amplification circuit) and the resonant circuit of the antenna 160.

With the carrier wave transmission circuit 906 being included, the reader/writer 100 has an initiator function in the communication based on NFC. Here, examples of the carrier waves transmitted by the carrier wave transmission circuit 906 from the antenna 160 include polling signals, and signals indicating various commands to be described later. Furthermore, transmission of the carrier waves performed by the carrier wave transmission circuit 906 is controlled by, for example, the MPU 901.

Note that the hardware configuration of the reader/writer 100 according to the present embodiment is not limited to the configuration illustrated in FIG. 15. For example, in a case where the reader/writer 100 communicates with an external device via an external communication device having a function similar to that of the communication interface 905, it may not include the communication interface 905.

Furthermore, in a case where the reader/writer 100 communicates with an external device via an external communication device having a function similar to that of the carrier wave transmission circuit 906 and the antenna 160, it may not include the carrier wave transmission circuit 906 and the antenna 160.

Furthermore, in a case where the reader/writer 100 communicates with an external device according to a communication scheme other than NFC, such as wireless communication using IEEE802.15.1, it may not include the carrier wave transmission circuit 906 and the antenna 160. In the case described above, the reader/writer 100 communicates with an external device by including a communication device supporting a communication scheme other than the communication based on NFC, or by an external communication device supporting a communication scheme other than the communication based on NFC.

Furthermore, the reader/writer 100 can also have a configuration not including the recording medium 904, for example.

Furthermore, the configuration illustrated in FIG. 15 may be implemented by one or more ICs, for example.

7. Conclusion

As described above, the reader/writer 100 according to the present disclosure is capable of detecting the position of the IC card 200 on the detection surface, and performs communication based on NFC on the basis of the detected position. Accordingly, more flexible contactless communication can be implemented.

Furthermore, the reader/writer 100 performs control in such a manner that the time when the detection processing of the IC card 200 is performed does not overlap the time when the communication based on NFC between the reader/writer 100 and the IC card 200 is performed. Accordingly, the reader/writer 100 can properly detect the IC card 200 without being affected by the magnetic field generated at the time of the communication based on NFC.

Furthermore, in a case where the position of the IC card 200 (or the IC card 200 itself) is not detected, the reader/writer 100 does not perform communication based on NFC. Accordingly, the reader/writer 100 can reduce the power required for the communication based on NFC.

Furthermore, the reader/writer 100 controls the wireless communication with the smartphone 300 on the basis of whether or not the identification information of the IC card 200 has been successfully obtained by the communication based on NFC with the IC card 200. As a result, in a case where an IC card other than the IC card 200, or other objects are placed on the detection surface, the reader/writer 100 does not wirelessly communicate with the smartphone 300, whereby the power required for the wireless communication can be reduced.

Furthermore, the reader/writer 100 according to the present disclosure is also capable of detecting the orientation of the IC card 200 placed on the detection surface.

Furthermore, the reader/writer 100 also detects a change in capacitance due to a portion other than the metal portion 240 in the IC card 200, and use a result of the detection for processing, whereby the detection accuracy of the IC card 200 can be further improved.

As described above, although the preferred embodiment of the present disclosure has been described in detail with reference to the accompanying drawings, the technical scope of the present disclosure is not limited to such examples. It is obvious that those skilled in the art in the technical field of the present disclosure may find various alterations and modifications within the scope of the appended claims, and it should be understood that such alterations and modifications are also naturally within the technical scope of the present disclosure.

For example, each of the steps illustrated in each of the sequence diagrams described above may not necessarily be processed in chronological order in the order illustrated as the sequence diagrams. In other words, each step may be processed in an order different from the order illustrated as the sequence diagram, or may be processed in parallel, as appropriate. Note that, as described above, the time when the detection processing of the IC card 200 is performed by the capacitance sensor 150 is different from the time when the communication based on NFC is performed, in principle.

Furthermore, the functional configuration of each device may be provided in an external device as appropriate. Furthermore, a part of the functions of each device may be embodied by the control unit of the device. For example, a part of the function of the detection unit 110, the communication unit 120, or the storage 140 of the reader/writer 100 may be embodied by the control unit 130.

Furthermore, the effects described in the present specification are merely illustrative or exemplary, and are not limited. That is, the technique according to the present disclosure can exert other effects obvious to those skilled in the art from the disclosure of the present specification together with or instead of the effects described above.

Note that the following configurations are also within the technical scope of the present disclosure.

(1)
An information processing apparatus, including:
a detection unit that detects a position of a device to be detected relative to a detection surface;
a first communication unit that performs contactless communication with the device on the basis of the position; and
a second communication unit that performs predetermined communication with an information processing terminal on the basis of acquisition of identification information of the device based on the contactless communication.

(2)
The information processing apparatus according to (1) described above, in which
the first communication unit includes a plurality of antennas corresponding to the detection surface, and performs the contactless communication using at least one of the antennas corresponding to the position.

(3)
The information processing apparatus according to (2) described above, in which
the first communication unit performs the contactless communication using one of the antennas closest to the position.

(4)
The information processing apparatus according to any one of (1) to (3) described above, in which
in a case where the position has not been detected, the first communication unit does not perform the contactless communication.

(5)
The information processing apparatus according to any one of (1) to (4) described above, in which
in a case where a change in the position has not been detected, the first communication unit does not perform the contactless communication.

(6)
The information processing apparatus according to any one of (1) to (5) described above, in which
time when processing related to the detection is performed does not overlap with time when the contactless communication is performed.

(7)
The information processing apparatus according to any one of (1) to (6) described above, in which
in a case where the identification information has not been obtained, the second communication unit does not perform the predetermined communication.

(8)
The information processing apparatus according to any one of (1) to (7) described above, in which
the detection unit includes a capacitance sensor.

(9)
The information processing apparatus according to (8) described above, in which
the detection unit detects the position on the basis of a detection result of one of or both of a metal portion and a non-metal portion of the device facing the capacitance sensor.

(10)
The information processing apparatus according to any one of (1) to (9) described above, in which
the detection unit also detects orientation of the device.

(11)
The information processing apparatus according to any one of (1) to (10) described above, in which
the device is an integrated circuit (IC) card,
the information processing apparatus is a reader/writer, and
the contactless communication is communication based on NFC.

(12)
An information processing system, including a device to be detected, and an information processing apparatus that detects the device, in which
the information processing apparatus includes:
a detection unit that detects a position of the device relative to a detection surface;
a first communication unit that performs contactless communication with the device on the basis of the position; and
a second communication unit that performs predetermined communication with an information processing terminal on the basis of acquisition of identification information of the device based on the contactless communication.

(13)
The information processing system according to (12) described above, in which
the device is an integrated circuit (IC) card including a polyethylene terephthalate (PET) sheet.

(14)
The information processing system according to (12) or (13) described above, in which
the device includes an inlay whose lengths in a longitudinal direction and in a lateral direction are different.

(15)

The information processing system according to any one of (12) to (14) described above, in which
the information processing system is a card game system.

(16)

A program for causing a computer to execute:

detecting a position of a device to be detected relative to a detection surface;

performing contactless communication with the device on the basis of the position; and performing predetermined communication with an information processing terminal on the basis of acquisition of identification information of the device based on the contactless communication.

REFERENCE SIGNS LIST

100 Reader/writer
110 Detection unit
111 Position detector
112 Orientation detector
120 Communication unit
121 First communication unit
122 Second communication unit
130 Control unit
140 Storage
200 IC card
210 Communication unit
220 Control unit
230 Storage
300 Smartphone
310 Communication unit
320 Control unit
330 Input unit
340 Output unit
350 Storage

The invention claimed is:

1. An information processing apparatus, comprising:
a detection surface;
a detection unit configured to detect a position of a device relative to the detection surface, wherein
a first time corresponds to the detection of the position;
a first communication unit configured to:
execute contactless communication with the device based on the detected position, wherein
a second time corresponds to the execution of the contactless communication, and
the first time does not overlap the second time; and
acquire identification information of the device based on the contactless communication; and
a second communication unit configured to execute a specific communication with an information processing terminal based on the acquisition of identification information.

2. The information processing apparatus according to claim 1, wherein
the first communication unit includes a plurality of antennas corresponding to the detection surface, and
the first communication unit is further configured to execute the contactless communication using at least one of the plurality of antennas corresponding to the detected position.

3. The information processing apparatus according to claim 2, wherein the first communication unit is further configured to execute the contactless communication using one of the plurality of antennas closest to the detected position.

4. The information processing apparatus according to claim 1, wherein in a case where the position has not been detected, the first communication unit does not perform the contactless communication.

5. The information processing apparatus according to claim 1, wherein in a case where a change in the position has not been detected, the first communication unit does not perform the contactless communication.

6. The information processing apparatus according to claim 1, wherein in a case where the identification information has not been acquired, the second communication unit does not perform the specific communication.

7. The information processing apparatus according to claim 1, wherein the detection unit includes a capacitance sensor.

8. The information processing apparatus according to claim 7, wherein the detection unit is further configured to detect the position based on a detection result of at least of a metal portion or a non-metal portion of the device that faces the capacitance sensor.

9. The information processing apparatus according to claim 1, wherein the detection unit is further configured to detect an orientation of the device.

10. The information processing apparatus according to claim 1, wherein
the device is an integrated circuit (IC) card,
the information processing apparatus is one of a reader or a writer, and
the contactless communication is communication based on near field communication (NFC).

11. An information processing system, comprising:
a device; and
an information processing apparatus configured to detect the device, wherein
the information processing apparatus includes:
a detection surface;
a detection unit configured to detect a position of the device relative to the detection surface, wherein
a first time corresponds to the detection of the position;
a first communication unit configured to:
execute contactless communication with the device based on the detected position, wherein
a second time corresponds to the execution of the contactless communication, and
the first time does not overlap the second time; and acquire identification information of the device based on the contactless communication; and
a second communication unit configured to execute a specific communication with an information processing terminal based on the acquisition of identification information.

12. The information processing system according to claim 11, wherein the device is an integrated circuit (IC) card including a polyethylene terephthalate (PET) sheet.

13. The information processing system according to claim 11, wherein
the device includes an inlay, and
a length of the inlay in a longitudinal direction is different from a length of the inlay in a lateral direction.

14. The information processing system according to claim 11, wherein the information processing system is a card game system.

15. A non-transitory computer-readable medium having stored thereon computer-executable instructions which, when executed by a processor, cause the processor to execute operations, the operations comprising:
  detecting a position of a device relative to a detection surface, wherein
    a first time corresponds to the detection of the position;
  executing contactless communication with the device based on the detected position, wherein
    a second time corresponds to the execution of the contactless communication, and
    the first time does not overlap the second time;
  acquiring identification information of the device based on the contactless communication; and
  executing specific communication with an information processing terminal based on the acquisition of identification information.

* * * * *